United States Patent [19]

Baresh

[11] Patent Number: 5,000,037

[45] Date of Patent: Mar. 19, 1991

[54] GAUGING APPARATUS AND METHOD

[75] Inventor: Joseph M. Baresh, Seattle, Wash.

[73] Assignee: The Boeing Company, Seattle, Wash.

[21] Appl. No.: 443,902

[22] Filed: Nov. 30, 1989

[51] Int. Cl.$^5$ .......................................... B23Q 17/09
[52] U.S. Cl. .................................... 73/104; 73/1 J; 33/552
[58] Field of Search .................. 73/104, 865.8, 865.9, 73/1 J; 33/542, 544, 551–555, 501.02–501.04, 702, 712, 783, 787, 788, 807, 827, DIG. 13

[56] References Cited

U.S. PATENT DOCUMENTS

| | | | |
|---|---|---|---|
| 2,619,728 | 12/1952 | Ely | 33/174 |
| 2,935,681 | 5/1960 | Anderson | 324/61 |
| 3,007,252 | 11/1961 | Munn | 33/DIG. 13 |
| 3,496,644 | 2/1970 | Short | 33/174 |
| 3,816,932 | 6/1974 | Legille | 33/174 |
| 3,821,856 | 7/1974 | Rap | 33/178 |
| 4,087,918 | 5/1978 | Schmid et al. | 33/174 |
| 4,221,053 | 9/1980 | Bobel, II et al. | 33/552 |
| 4,235,020 | 11/1980 | Davis et al. | 324/220 |
| 4,294,015 | 10/1981 | Drouin et al. | 33/174 |
| 4,649,752 | 3/1987 | Turner | 73/760 |
| 4,651,436 | 3/1987 | Gaal | 33/533 |
| 4,703,648 | 11/1987 | Baresh | 73/104 |

FOREIGN PATENT DOCUMENTS

| | | | |
|---|---|---|---|
| 0193003 | 8/1986 | Japan | 73/1 J |
| 0924531 | 4/1982 | U.S.S.R. | 73/1 J |

Primary Examiner—Robert R. Raevis
Attorney, Agent, or Firm—Christensen, O'Connor, Johnson & Kindness

[57] ABSTRACT

Disclosed is an apparatus and method for gauging the amount of warpage in a composite panel. In the gauging operation, elongate spacer strips (18) of uniform thickness are placed on the layup surface (14) of a mold (12) to support a panel (10) spaced apart from the mold layup surface (14) by a gap (22) of dimension equal to the thickness of the spacer strips (18). A sensor wand (26) that includes a strain gauge sensor assembly (32) is inserted in the gap (22) to detect and measure gap variations. Instrumentation (66,68) is utilized to operate strain gauges (52) that are included in the strain gauge sensor assembly (32) as a conventional bridge circuit. Measurement error caused by twisting and tilting of sensor wand (26) is minimized by smoothly contoured contact protrusions (54) of the strain gauge sensor assembly (32) that bear against panel surface (16) and layup surface (14). The width of sensor wand (26) and the mounting location of the strain gauge sensor assembly (32) also are established to minimize measurement error caused by twisting and tilting of sensor wand (26). Also included is a calibration fixture (70) for determining the relationship between electrical singnals supplied by strain gauges (52) and gap dimension so that variations in gap dimension and hence the contour of panel surface (16) can accurately be determined.

14 Claims, 7 Drawing Sheets

GAUGING APPARATUS AND METHOD

FIELD OF THE INVENTION

This invention relates to apparatus and methods for determining whether a formed part or component exhibits a desired surface contour. More specifically, this invention relates to apparatus and method for gauging the warpage in panel-like structure that is formed with thermosetting composite materials and is fabricated to a desired contour with a surface mold or fixture.

BACKGROUND OF THE INVENTION

There are numerous situations in which composite material is molded or formed to provide high strength, lightweight items or components that exhibit a desired geometry. One application of increasing importance is the fabrication of aircraft components such as wing and stabilizer panels that are formed from thermosetting resins and high strength anisotropic fibers such as graphite. Typically, the panels are formed to exhibit a desired surface contour by placing layers of uncured composite material on a mold having an upper surface that is machined or otherwise shaped to match the contour to be established in the finished panel. The laid up composite material is then cured by, for example, placing the mold in an autoclave.

To be suitable for use in an aircraft, the surface contour of the fabricated panel cannot deviate from the contour of the mold by more than a specified amount. Although the surface area of such panels often is relatively large, a contour tolerance on the order of a few hundredths of an inch may be imposed.

Since the surface of the mold is machined or otherwise formed to reflect the desired contour of the fabricated composite panels, several attempts have been made to use the mold for dimensional inspection of the panel surface. For example, attempts have been made to use feeler gauges to measure gaps between the mold and the surface of the panel that can be caused by warpage during the curing process. However, feeler gauges are not suitable for inspecting surface contours of large composite panels because they only can be used along the periphery of the panel to measure gaps between the panel and the mold.

Another prior technique that has been used in an attempt to measure the thickness of gaps between a composite panel and the mold uses a conventional eddy current sensor and an ultrasonic thickness gauge. The eddy current sensor is positioned at a number of predetermined locations on the surface of the composite panel that faces away from the mold and is used to determine the distance between that panel surface and the surface of the mold that determines the panel contour. The ultrasonic thickness gauge also is placed on the surface of the composite panel that faces away from the mold at the same locations as the eddy current sensor and determines the thickness of the panel. If the local thickness of the composite panel is uniform, the difference between the two measurements is indicative of gaps (and hence warpage) at the measurement locations. Because this technique is based on measurements between the mold and the surface of the composite panel that faces away from the mold, it often is not usable in situations in which the surface of the composite panel that faces the mold must closely conform to the mold contour without a corresponding requirement on the contour or smoothness of the other panel surface.

Further, the eddy current sensor/ultrasonic thickness gauge technique cannot be employed in situations in which the entire mold or the surface of the mold is formed of a nonconductive material (e.g., a composite material). A further disadvantage or drawback with respect to relatively large panels, such as wing and stabilizer panels, is that mechanical arms or other structure must be used to position the eddy current sensor and ultrasonic gauge at locations that cannot otherwise be reached by operating personnel. For all these reasons, the eddy current sensor/ultrasonic gauge technique often is not desirable from the standpoint of complexity, equipment cost, and the amount of time required to perform the desired dimensional inspection.

U.S. Pat. No. 4,703,648, which is assigned to the assignee of this invention, discloses a technique that at least partially overcomes disadvantages and drawbacks of prior techniques used to measure the thickness of gaps between a composite panel and the mold utilized to form the composite panel. In the technique disclosed in U.S. Pat. No. 4,703,648, the panel is first removed from the mold and elongate, inelastically deformable gauging strips are positioned on the surface of the mold at locations at which conformity between the mold contour and the contour of the panel are to be determined. Also placed on the surface of the mold is a series of inflatable tubes that are positioned at locations that do not interfere with the positioning of the inelastically deformable gauging strips. To perform the gauging operation, the tubes are inflated and the composite panel is placed on top of the tubes in a position that is spaced apart from and above the position in which the panel was molded. The tubes then are deflated to slowly lower the panel so that the molded surface thereof presses downwardly on and flattens or crushes the inelastically deformable gauging strips. When the panel has settled into a position in which it is supported only by the gauging strips, the tubes are reinflated to lift the panel off the gauging strips. The panel is then removed and the thickness of the gauging strips is measured to thereby determine panel warpage at the desired measuring points.

Although the technique disclosed in U.S. Pat. No. 4,703,648 at least partially alleviates disadvantages and drawbacks of prior techniques, a need exists for improved warpage gauging methods and apparatus. For example, placement of the inelastically deformable gauging strips and the inflatable tubes must be carefully executed and, thus, can consume a substantial amount of time. Inflation of the tubes, replacement of the panel in its proper position and the subsequent steps of deflating the tubes and removing the panels also is a time-consuming process. The final step of measuring the thickness of the deformed gauging strips also is a time-consuming process that must be executed with care. Further, if the measurement results are not conclusive (e.g., the results indicate panel regions at or very near the allowed contour tolerance), the panel cannot be reinspected without repeating the entire measurement process.

One prior technique that has been utilized in a different dimensional inspection application relates to the use of strain gauges to detect and measure abnormalities in the inner diameter of rigid, precisely dimensioned tubing (e.g., detect and measure dents in the tubing wall). More specifically, U.S. Pat. No. 4,235,020 discloses a cylindrical scanner or sensor that includes eight spring fingers that are equally spaced about the circumference of the scanner and extend radially outward. Located on each spring finger is a pair of strain gauges that are positioned so that radial deflection of the spring finger results in changes in the electrical resistance of the strain gauges. The scanner is dimensioned so that the spring fingers bear against and are urged radially inward by the inner wall of the tube to be inspected. To detect and measure dents or other abnormalities in the inner diameter of the tubing, the sensor is pulled through the tube at a predetermined uniform speed by a cable. Dents or other irregularities in the inner wall of the tube cause spring fingers that contact the irregularity to deflect which, in turn, causes a change in the resistance of the associated pair of strain gauges. Since the eight pair of strain gauges can be connected in a variety of manners, including arranging four strain gauges of two selected spring fingers to form a conventional bridge circuit, deviations in the diameter of the tube can be measured. Since the speed at which the sensor is pulled through the tube is uniform and known, the location of the dimensional irregularity also can be detected.

The sensors of the type disclosed in U.S. Pat. No. 4,235,020 are not suitable for use in measuring the gap between two planar surfaces. Specifically, those devices are designed to be contained by the inner wall of a tube or other structure so that the orientation of the sensor within the tube remains constant as the sensor is pulled through the tube. Thus, the spring fingers are deflected only by dents or other irregularities in the inner wall of the tube. In contrast, if such a sensor were drawn along the gap between two contoured planar surfaces, the sensor would be free to twist or rotate and free to tilt up or down relative to the direction of travel. With a sensor of the type disclosed in U.S. Pat. No. 4,235,020, any such changes in physical orientation of the sensor would cause at least some deflection of the spring fingers, thus affecting the resistance of the strain gauges and causing measurement error. Since warpage of composite panels such as aircraft wing and stabilizer panels often is limited to a few hundredths of an inch, reliable inspection is not possible unless the sensor is accurate within a few thousandths of an inch. Sensors of the type disclosed in U.S. Pat. No. 4,235,020, include no provision that would result in the required measurement accuracy in the composite panel warpage measurement environment.

SUMMARY OF THE INVENTION

The apparatus provided by this invention includes an elongate flexible wand, which in the currently preferred embodiment of the invention is of rectangular cross-sectional geometry. Mounted in an opening near one end of the wand is a sensor that includes a pair of leaf springs that extend angularly away from one another and are mounted to project outwardly from the upper and lower surface of the wand. Included on each of the two leaf springs is a pair of strain gauges that are mounted to sense deflection of the leaf springs.

When the sensor-equipped wand is utilized for determining the warpage of composite panels, elongate spacer strips that are formed of flexible, relatively incompressible material are placed on the surface of the mold and the panel is positioned on the spacer strips so that the surface of the panel is located directly above the region of the mold that formed the panel. The spacer strips are machined or otherwise formed to a uniform thickness that is slightly greater than the thickness of the wand. In addition, the leaf springs of the sensor are dimensioned and arranged so that insertion of the wand into the gap formed between the mold and the panel causes the leaf springs to contact the surfaces of the mold and panel and be slightly deflected toward one another.

Various features are incorporated in the wand and the sensor to eliminate measurement errors that could be caused by changes in the orientation of the wand and sensor as the device is moved between desired measuring points. First, the wand is substantially wider than the gap that is formed between the composite panel and the mold. Thus, rolling or twisting of the wand about its longitudinal centerline is limited. Second, the wand extends beyond the sensor to limit sensor tilt or pitch (angular offset relative to the longitudinal centerline of the wand). Third, and most important, the region of each sensor leaf spring that contacts the mold surface is a smoothly contoured rounded protrusion that is of substantially hemispherical geometry in the currently preferred embodiments of the invention. The curvature of these protrusions is established so that there is substantially no deflection of the leaf springs for the degree of pitch and roll that can be encountered by the sensor for the gap measurement range of interest. Thus, when the two pairs of strain gauges are connected to form a conventional resistive measurement bridge, an electrical signal is produced that varies only in accordance with variation in the gap distance (i.e., panel warpage).

The currently preferred embodiments of the invention also include features and aspects that enhance the measurement accuracy of the sensor equipped wand and facilitate its use. For example, in the currently preferred embodiments of the invention in which the end region of one of the sensor leaf springs is joined to the surface of the second leaf spring, the region of the second leaf spring that surrounds the juncture of the spring includes a central cutout region. This imparts substantially identical flexure characteristics to the leaf springs, thereby equalizing the measurement sensitivity of the leaf springs and enhancing sensor accuracy. The cutout region also provides for passage of the electrical conductors of the strain gauge that is mounted on the second leaf spring. To facilitate location of desired measurement points, the currently preferred embodiments of the invention include a scale that is embedded in the upper surface of the wand. Thus, the depth of insertion easily can be ascertained. Further, a sensor calibration fixture is provided that includes a rectangular passage into which the wand can be inserted. The rectangular passage includes a series of precisely dimensioned steps that provide several gap dimensions that are within the sensor range. By using the calibration accessory adjust (i.e. "zero") the associated test instrumentation prior to each inspection operation, maximum measurement accuracy is ensured.

BRIEF DESCRIPTION OF THE DRAWINGS

The foregoing features and advantages of the invention will be better understood from the following description when considered in conjunction with the attached drawing in which.

DETAILED DESCRIPTION

Figure 1:
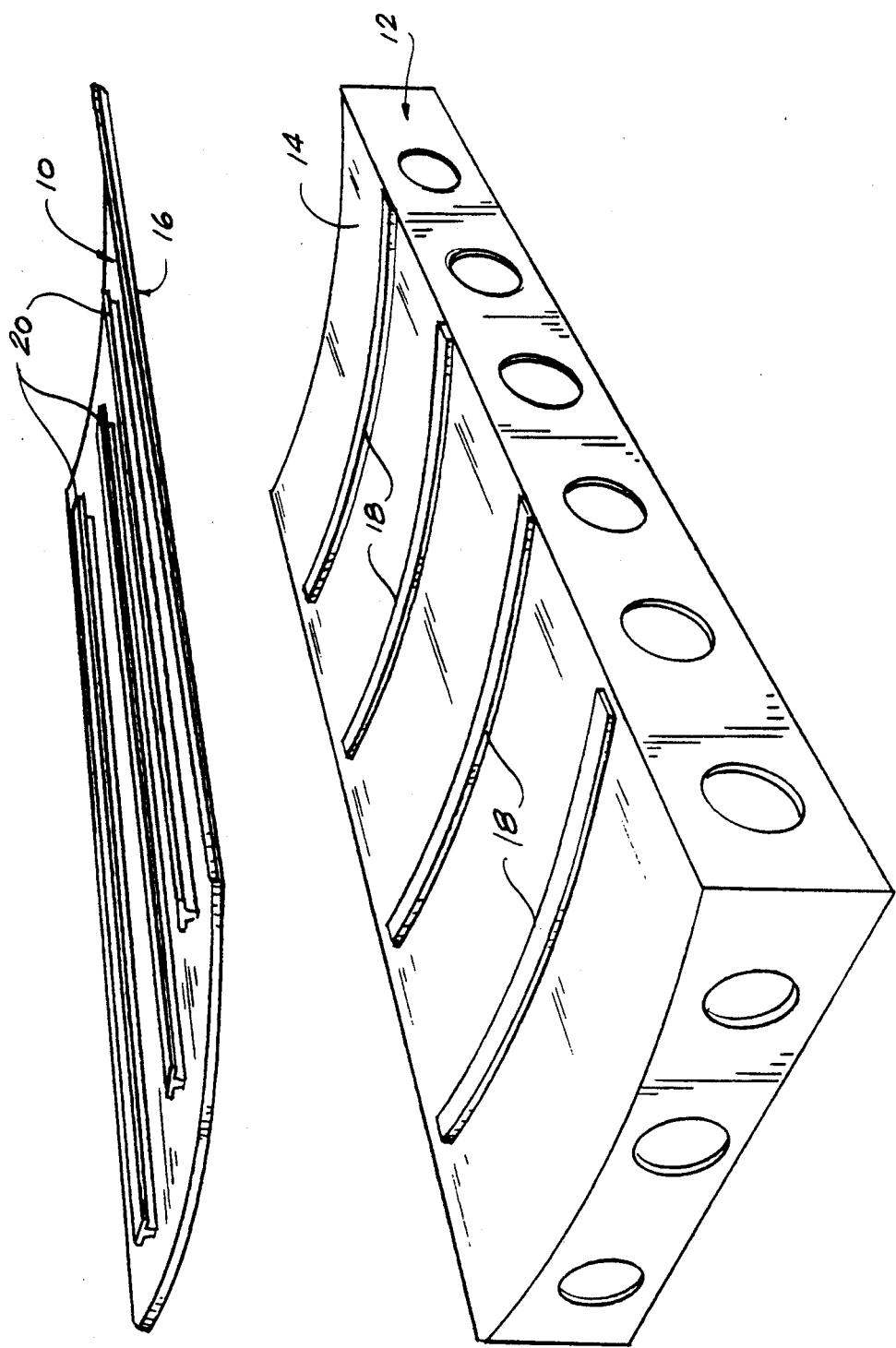
FIG. 1 is an isometric view that illustrates placement of a composite panel in spaced-apart relationship with a mold so that warpage measurement can be performed in accordance with the invention.

FIGS. 1-5 illustrate the major components of gauging apparatus constructed in accordance with this invention. Shown in FIG. 1 is a composite panel 10 which is suspended above a mold 12 that includes a molding or layup surface 14 for establishing desired curvature and surface features in surface 16 of composite panel 10. Located on layup surface 14 of mold 12 are a series of spaced-apart elongate spacers 18 that are used in the practice of the invention, but are not present on layup surface 14 when composite panel 10 is fabricated.

The composite panel 10 that is shown in FIG. 1 typifies aircraft wing and stabilizer panels, which may be several feet in length and width. When the panel is fabricated, layers of composite sheets or strips are applied directly to layup surface 14 of mold 12. Typically, the laid-up composite material consists of side-by-side strips of fiber roving that are impregnated with an uncured thermosetting resin binder. Often the composite material layers overlap one another and multiple layers are built up in sandwich-like fashion. As is shown in FIG. 1, composite panels for use in aircraft commonly include reinforcing stringers 20 that extend along the surface of panel 10 that faces away from mold 12 during the fabrication process. Stringers 20, which are T-shaped in FIG. 1, are joined to the composite panel 10 with additional strips of composite material or other means during layup of composite panel 10. When layer of composite panel 10 is complete, the panel is cured on top of mold 12 to form a lightweight, high strength unitary structure with surface 16 of composite panel 10 matching the curvature and any other surface features of the mold layup surface 14. Typically, curing takes place in an autoclave in which temperature and any other important parameters such as humidity are closely controlled.

When a composite panel such as panel 10 of FIG. 1 is to be inspected in accordance with this invention, the cured panel is removed from layup surface 14 of mold 12 and spacer strips 18 are placed on layup surface 14 in the spaced-apart manner depicted in FIG. 1. Each spacer strip 18 is formed of a material flexible enough to allow the spacer strips to exactly follow the contour of layup surface 14. Further, each spacer strip 18 is machined or otherwise formed to a uniform predetermined thickness. In addition, the spacer strips 18 must bear the weight of composite panel 10 and any weight (i.e., loading) that is applied to the upper surface of composite panel 10 during the hereinafter described gauging procedure. In the currently preferred embodiments of the invention, spacer strips 18 are formed of acrylonitrile-butadiene-styrene copolymer (ABS). In one realization of the invention, the spacer strips 18 are machined to a thickness of 0.125 inch±0.001 inch.

Regardless of the material and thickness of the spacer strips 18, the strips are positioned on layup surface 14 at locations that will maintain surface 16 of panel 10 in uniform spaced-apart juxtaposition with layer surface 14 when panel 10 is lowered into a position that corresponds to the position it occupied when the panel was fabricated (e.g., spacer strips 18 are placed beneath reinforcing stringers 20 or other panel features such as rib stations). Thus, as is indicated more clearly in FIG. 4, a gap 22 is formed between layer surface 14 of mold 12 and surface 16 of composite panel 10. Since surface 16 of panel 10 rests on the upper surface of spacer strips 18, gap 22 will be constant, except for regions in which panel warpage has occurred. If desired or necessary, weights 24 (FIG. 4), such as bags filled with shot, can be placed on top of composite panel 10. When used, weights 24 are placed directly over spacer strip locations and are distributed along the edges of composite panel 10 to urge the panel into contact with spacer strips 18 without deforming composite panel 10 downwardly into gap 22.

Figure 2:
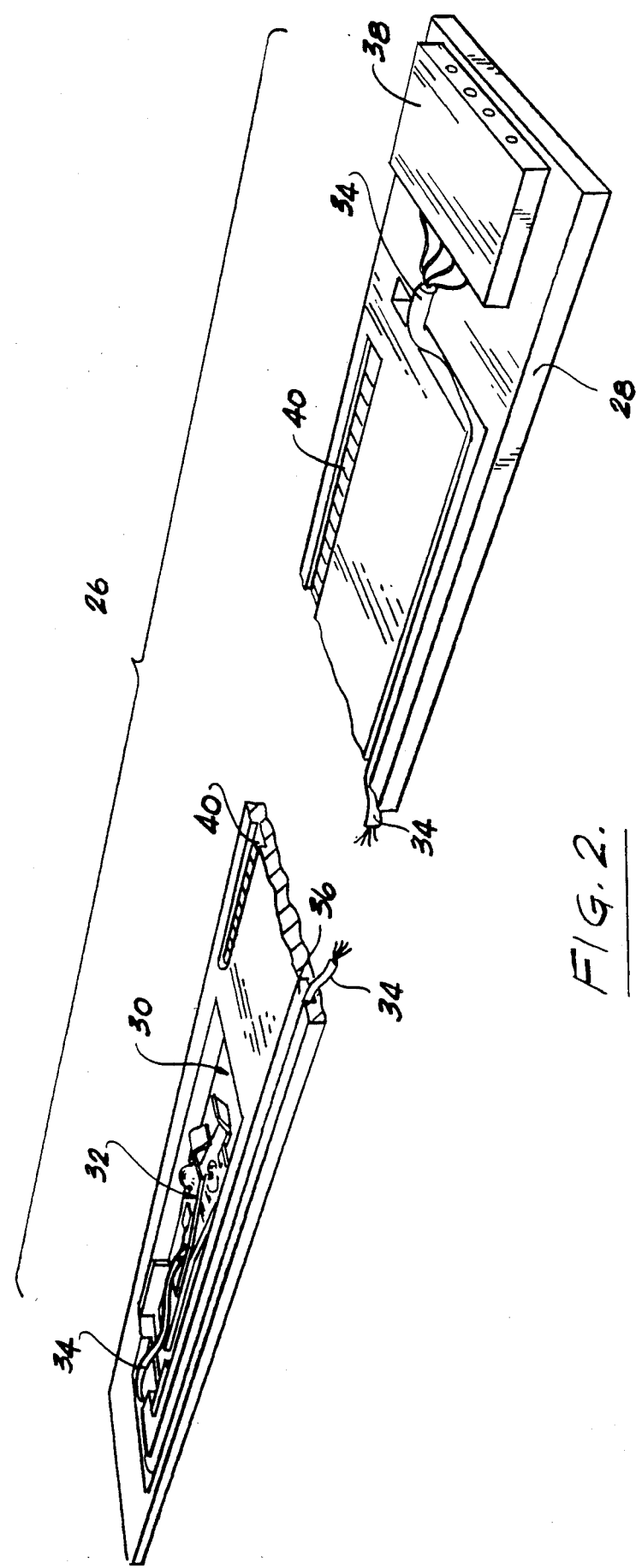
FIG. 2 is an isometric view of a sensor wand that is constructed in accordance with the invention.
Figure 3:
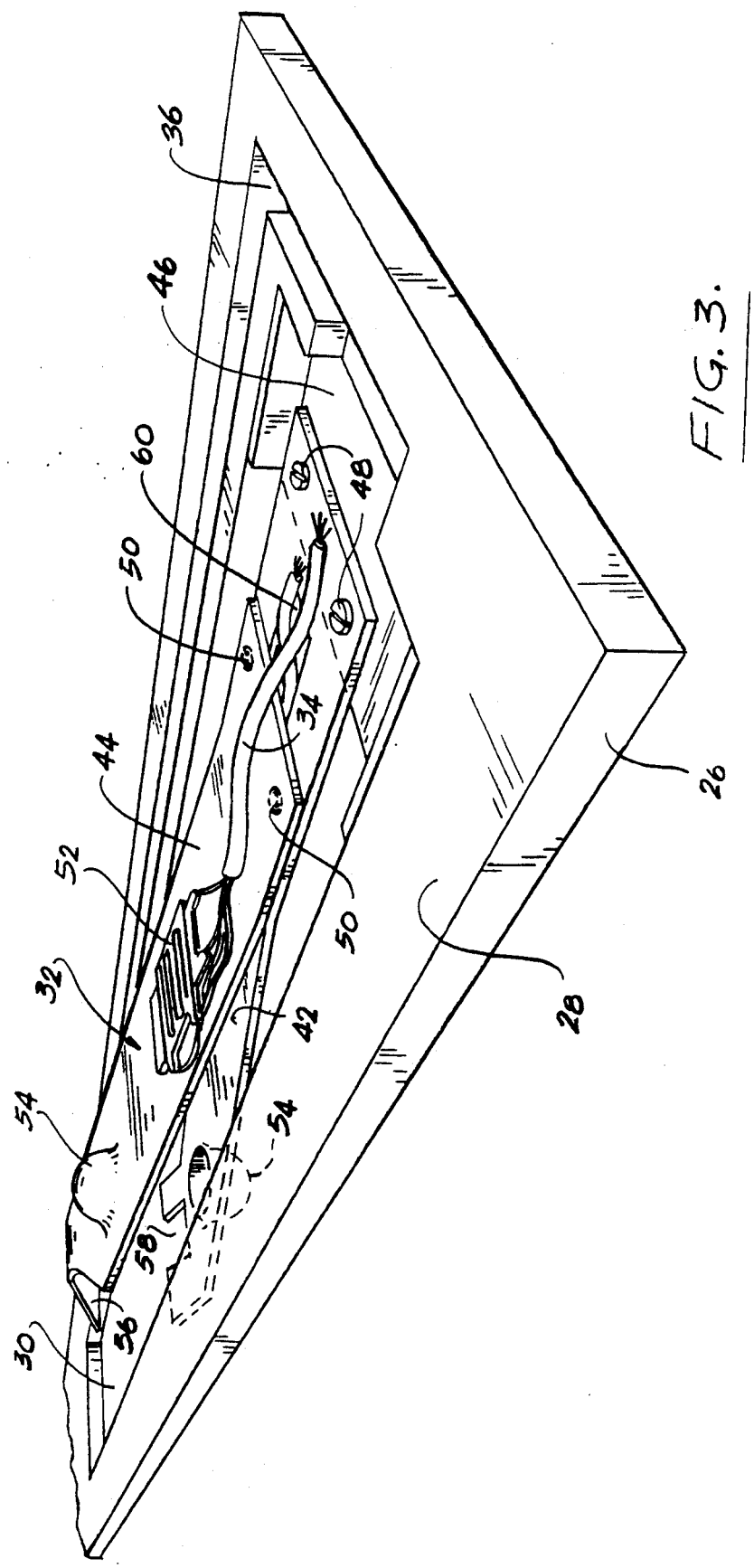
FIG. 3 is an enlarged isometric view of the sensor region of the wand.
Figure 4:
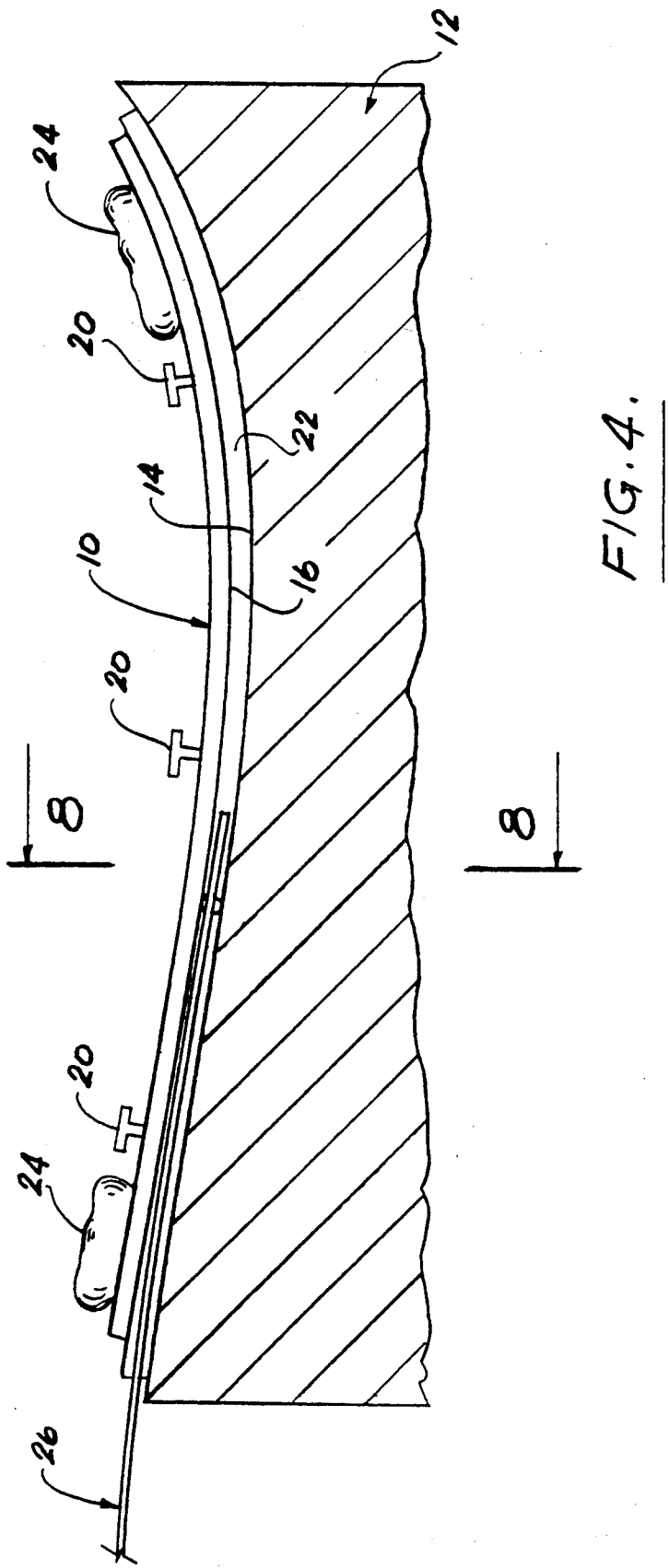
FIG. 4 is a side elevation view that illustrates the sensor wand inserted in the gap that is formed between the mold and the composite panel.

Referring now to FIGS. 2-4, in accordance with the invention, regions of warpage are located and measured by a sensor wand 26 that is inserted into and moved along gap 22 in the manner indicated in FIG. 4. As is shown in FIGS. 2 and 3, sensor wand 26 includes an elongate plate-like wand 28, which is of rectangular cross-sectional geometry in the depicted embodiment. To allow sensor wand 26 to be inserted into and moved through gap 22, wand 28 is constructed of relatively flexible material (e.g., ABS) and the thickness of wand 28 is slightly less than the thickness of spacer strips 18. For example, in the realization of the invention in which spacer strips 18 are 0.125 inches, the thickness of wand 28 is 0.110 inch. Located in a rectangular cutout region 30 that is near the end of wand 28 that is inserted into gap 22 is a strain gauge sensor assembly 32. A small cable 34 for interconnecting strain gauge sensor assembly 32 with appropriate test instrumentation is routed along and recessed in a groove 36 that is formed in the upper surface of wand 28. As is shown in FIG. 2, groove 36 and cable 34 extend between strain gauge sensor 32 and an electrical connector 38 that is located at the opposite end of wand 28. To assist in positioning sensor wand 26 for measurement of warpage at desired locations in gap 22, graduation marks indicating the distance between the edge of composite panel 10 and the insertion position of strain gauge sensor assembly 32 are included along one edge of wand 28. In the depicted embodiment, a scale 40 that is graduated in inches is recessed in the upper surface of wand 28.

As is most clearly shown in FIG. 3, strain gauge sensor assembly 32 includes a lower leaf spring 42 and an upper leaf spring 44. One end of lower leaf spring 42 is secured by screws 48 or other conventional fastening means to a shelf-like recessed region 46 that is located at one end of rectangular cutout 30 of wand 28. Beginning from the point at which it is secured to wand 28, lower leaf spring 42 initially extends into rectangular cutout 30 with the upper surface of lower leaf spring 42 being substantially parallel to the surface of wand 28. Lower leaf spring 42 then projects angularly downward so as to project below the lower surface of wand 28. One end of upper leaf spring 44 is joined to lower leaf spring 42 by spotwelds 50 or other conventional techniques. In the depicted embodiment, the end of upper leaf spring 44 that is joined to lower leaf spring 42 is spaced away from the end of lower leaf spring 42 that is joined to wand 28. Upper leaf spring 44 is configured similarly to lower leaf spring 42, first extending into rectangular cutout 30 and then extending angularly upward so that the distal or free end of upper leaf spring 44 projects above the upper surface of wand 28. The outwardly projecting regions of lower leaf spring 42 and upper leaf spring 44 are substantially identical in configuration so that the leaf springs are symmetrically disposed about the longitudinal centerline of sensor wand 26.

Located on and bonded to the upper surface of upper leaf spring 44 is a pair of strain gauges 52. One of the strain gauges is arranged so that its axis of sensitivity extends parallel to the longitudinal centerline of upper leaf spring 44. The axis of sensitivity of the second strain gauge is perpendicular to the axis of sensitivity of the first strain gauge (and hence the longitudinal centerline of upper leaf spring 44). As is known in the electrical arts, pairs of strain gauges that are arranged with perpendicular sensitivity axes are commercially available. For example, in a current realization of strain gauge sensor assembly 32, a strain gauge pair is used that is supplied by Micromeasurements Division of Measurements Group, Inc. Raleigh, N.C., and is identified by part no. CEA-06-062WT-350. Although not shown in FIG. 3, a second pair of strain gauges is similarly mounted to the lower surface of lower leaf spring 42 with conductors of the previously mentioned electrical cable 34 being electrically connected to each pair of strain gauges 52.

With continued reference to FIG. 3, located near the free end of both lower leaf spring 42 and upper leaf spring 44 is a contact protrusion 54 that extends outwardly away from wand 28. Contact protrusions 54 bear against surface 16 of panel 10 and layup surface 14 of mold 12 when sensor wand 26 is inserted in gap 22 in the manner shown in FIG. 4. When sensor wand 26 is not inserted in gap 22, the distance between the portions of contact protrusions 54 that contact panel surface 16 and layup surface 14 slightly exceeds the maximum gap distance that can be measured with sensor wand 26. Thus, when sensor wand 26 is inserted in gap 22, the free ends of lower leaf spring 42 and upper leaf spring 44 are deflected toward one another. The deflection causes changes in the resistance of the strain gauges that have sensitivity axes that extend longitudinally along the leaf springs (i.e., one strain gauge of each pair of strain gauges 52).

As is shown in FIG. 3, each contact protrusion 54 is of a rounded, smoothly contoured configuration. In the currently preferred embodiments, contact protrusions 54 are substantially hemispherical in geometry. Thus, only small surface regions of contact protrusions 54 contact layup surface 14 of mold 12 and panel surface 16 of composite panel 10 when sensor wand 26 is inserted into gap 22 in the manner shown in FIG. 4. As shall be described relative to FIGS. 8 and 9, preferably the radius of each contact protrusion 54 is established in view of the gap dimensions to be measured or examined with sensor wand 26 to prevent deflection of lower leaf spring 42 and upper leaf spring 44 as a result of twisting or tilting of the portion of sensor wand 26 that includes strain gauge sensor assembly 32. As also shall be described relative to FIGS. 8 and 9, the distance between contact protrusions 54 and the end of wand 28 and the width of wand 28 preferably are established to virtually eliminate sensor error caused by twisting or tilting of strain gauge sensor assembly 32 within gap 22.

Figure 6:
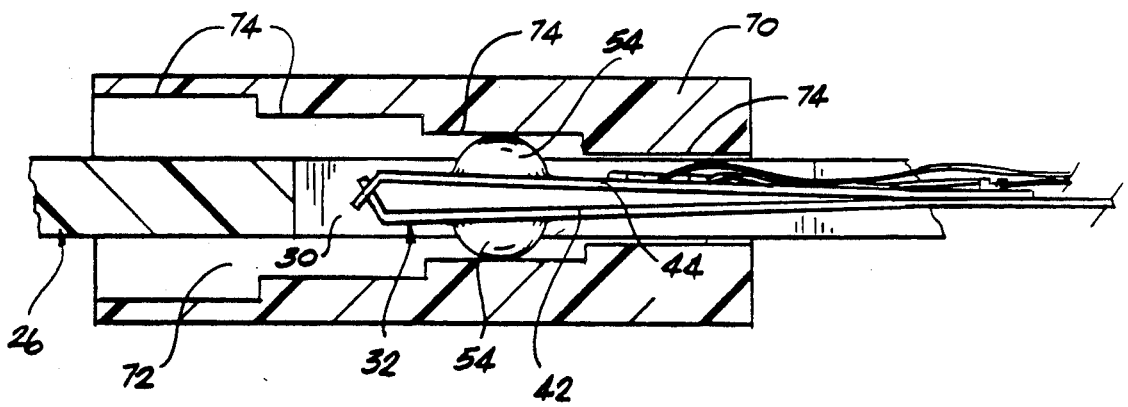
FIG. 6 is a cross-sectional view of a calibration fixture that depicts the wand inserted in the calibration fixture.
Figure 9:
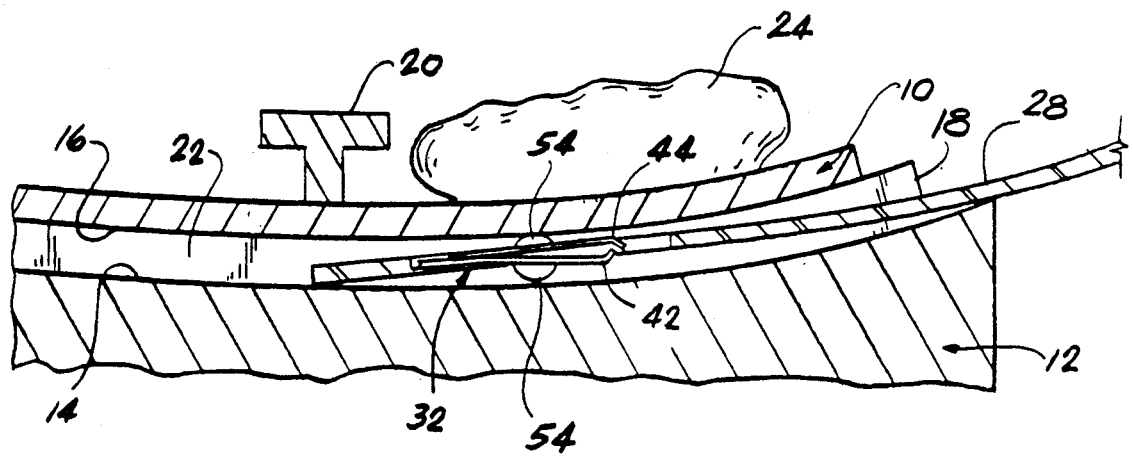
FIG. 9 is a partial cross-sectional view taken along arrows 9—9 of FIG. 8 which illustrates the manner in which the sensor and wand are configured to provide sensor insensitivity to tilting or pitching of the wand when it is positioned in curved regions of a gap formed between the composite panel and the mold.

There are two other notable provisions of strain gauge sensor assembly 32 of FIG. 3. First, the terminal portion of the free end of upper leaf spring 44 tapers to a substantially rectangular tab 56 that extends angularly toward wand 28. The terminal portion of the free end of lower leaf spring 42 also extends angularly toward wand 26 is inserted in gap 22 (FIG. 4), the leaf springs are deflected toward one another and tab 56 extends into notch 58. Thus, as can be seen in FIGS. 6 and 9, when the leaf springs are deflected into their normal operating position, the free ends of the lower leaf spring 42 and upper leaf spring 44 are within rectangular cutout 30 of wand 28. This ensures that the free ends of the leaf springs will not come into contact with layup surface 14 of mold 12 or surface 16 of panel 10 thereby preventing possible damage to strain gauge sensor assembly 32 and/or erroneous gap indication.

The second additional feature of strain gauge sensor assembly 32 that should be noted is a longitudinally extending rectangular cutout 60 in lower leaf spring 42. As is shown in FIG. 3, rectangular cutout 60 extends beneath the end of upper leaf spring 44 that is joined to lower leaf spring 42. The size of rectangular cutout 60 is established to impart substantially identical flexure characteristics to lower leaf spring 42 and upper leaf spring 44. That is, rectangular cutout 60 ensures substantially equal deflection of lower leaf spring 42 and upper leaf spring 44 for all gap dimensions within the measurement range of strain gauge sensor assembly 32. This equalization enhances sensor accuracy. Rectangular cutout 60 also provides for passage of cable 34, which interconnects the strain gauge pair that is mounted on lower leaf spring 42 with electrical connector 38.

Figure 5:
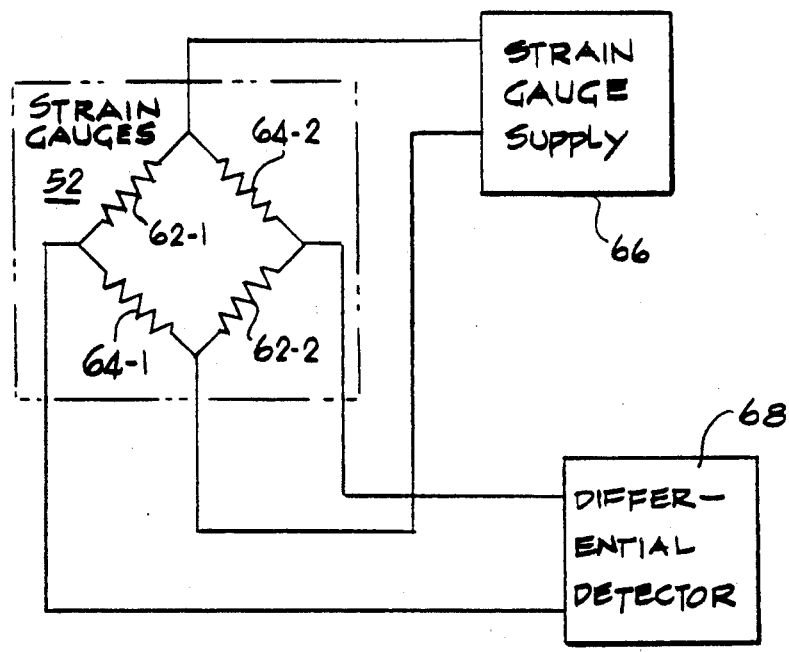
FIG. 5 is a schematic diagram of the sensor strain gauges and instrumentation utilized in the practice of the invention.

FIG. 5 is a block diagram that schematically depicts the manner in which strain gauge sensors 52 of sensor wand 26 are electrically connected to test instrumentation for measuring deviations in gap 22 (FIG. 4) and, hence, warpage in surface 16 of composite panel 10. In FIG. 5, the pair of strain gauges 52 that is mounted on lower leaf spring 42 is represented by resistors 62-1 and 64-1, and the pair of strain gauges that is mounted on upper leaf spring 44 is represented by 62-2 and 64-2. In the depicted arrangement, resistors 62-1 and 62-2 respectively correspond to the strain gauges that are mounted so that the strain gauge axes of sensitivity are substantially parallel to the longitudinal centerlines of the respective leaf springs. Resistors 64-1 and 64-2 respectively correspond to the strain gauges of lower leaf spring 42 and upper leaf spring 44 whose axes are perpendicular to the longitudinal centerlines of the leaf springs. With this arrangement, the resistance values of resistors 62-1 and 62-2 are a function of both ambient temperature and deflection of the leaf springs to which the corresponding strain gauges are mounted. On the other hand, the resistance value of resistor 64-2 and resistor 64-1 are a function only of ambient temperature.

When the resistive elements of the strain gauges are connected in a conventional bridge arrangement of the type shown in FIG. 5, the strain gauges in effect form voltage dividers which produce a temperature-compensated signal that indicates the difference in the strain applied to the two pairs of strain gauges (e.g., the combined deflection of lower leaf spring 42 and upper leaf spring 44 in the arrangement of strain gauge sensor assembly 32). More specifically, in the arrangement of FIG. 5, a strain gauge supply 66 establishes a predetermined potential (voltage) across each pair of resistors that correspond to each pair of strain gauges 52. A differential detector 68 measures the difference in potential that is developed at the juncture between the resistors that correspond to each strain gauge pair. Since the potential at each of these junctures is proportional to the deflection of the associated leaf spring (strain induced at the strain gauge), the potential measured by differential detector 68 indicates total deflection of the leaf springs and, hence, gap dimension.

It should be recognized that the block diagram shown in FIG. 5 is simplified for purposes of discussion. In actual practice, the terminals of each strain gauge pair are each connected to apparatus that serves the function of strain gauge supply 66 in FIG. 5. This permits initial balancing of the measurement bridge to compensate for strain gauge resistance variation that results from manufacturing tolerances and other factors. It also should be recognized that various strain gauge instrumentation devices are available. For example, device identified as the Daytronic mode 3270 Conditioner Indicator and the DataMyte model 753 Data Collector have been successfully used in the practice of this invention.

Regardless of the specific type of instrumentation employed in the practice of the invention, precise gap measurement (and, hence, warpage measurement) requires knowledge of the relationship between gap dimension and the electrical signal provided by strain gauges sensor assembly 3. Shown in FIG. 6 is a calibration fixture 70 that can be used to determine the relationship between gap dimension and electrical signal output and, further, can be used to adjust (i.e., "zero") the measurement system when each gap measurement procedure is initiated. Calibration fixture 70 of FIG. 6 includes a rectangular passage 72 into which sensor wand 26 can be inserted. Passage 72 is formed to provide a number of precisely dimensioned steps 74 that provide a corresponding number of gap dimensions that are with the gap measurement range of sensor wand 26. For example, in the previously mentioned realization of the invention that employs spacer strips 18 which are 0.125 inch thick, the narrowest gap formed in calibration fixture 70 is approximately equal to 0.125 inch, with the exact gap dimension being known (e.g., a gap of 0.1245 inch). The remaining gaps that are formed in passage 70 by steps 74 are nominally dimensioned to provide a series of increasing gap dimensions, with the greatest gap dimension being approximately equal to the maximum gap that can be measured with sensor wand 26. For example, strain gauge sensor assembly 32 of the previously mentioned realization of the invention is capable of measuring gaps as wide as 0.250 inch. The calibration fixture 70 for this particular realization of the invention included five different gap dimensions ranging between nominal gap dimensions of 0.125 inch and 0.250 inch in increments of approximately 0.030 inch. One calibration fixture 70 that was machined to these nominal dimensions provide gap dimensions of 0.1245 inch, 0.1540 inch, 0.1850 inch, 0.2020 inch and 0.2440 inch.

It will be recognized by those skilled in the art that calibration fixture 70 can be constructed in various manners. One manner of constructing calibration fixtures 70 that has proven satisfactory is joining together two metal plates that are identically configured to define the upper and lower stepped boundary regions of passage 72. More specifically, an identical series of stepped regions of a width equal to the desired width of passage 72 is machined in the surface of two metal plates. The two plates then are securely fastened to one another by bolts or other conventional fasteners that are positioned beyond the edge boundaries of passage 72. After assembly, the gap dimensions defined by the steps are measured by ball gauges or other suitable instruments to determine the exact gap dimensions.

Figure 7:
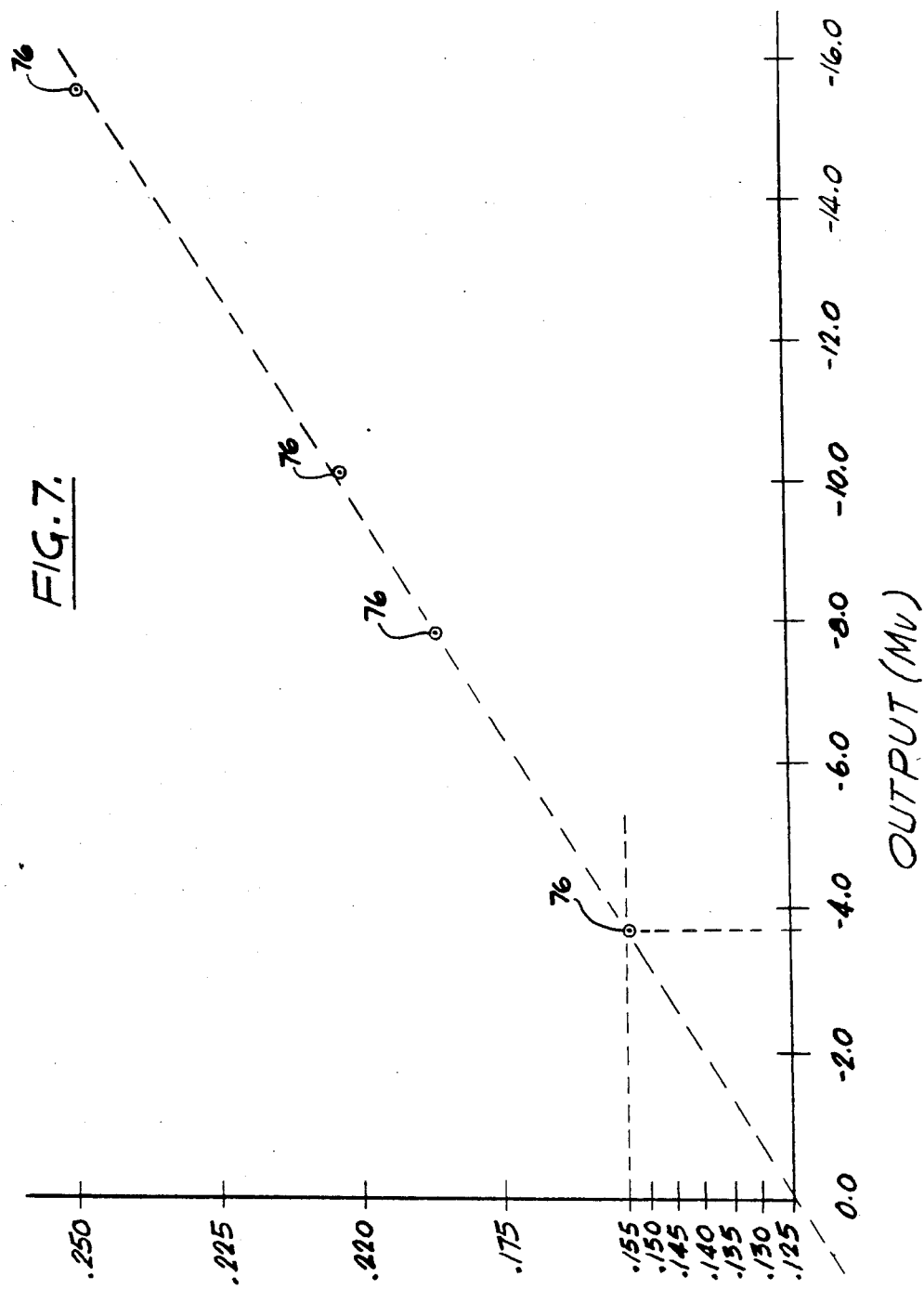
FIG. 7 graphically depicts the typical relationship between gap dimension (and hence composite panel warpage) and electrical signal output.

FIG. 7 illustrates a calibration curve (i.e., gap dimension-electric signal output relationship) for a particular sensor wand 26 that is configured in the previously described manner and is connected to appropriate instrumentation in the manner described relative to FIG. 5. In generating the calibration curve of FIG. 7, the sensor wand was inserted in calibration fixture 70 of FIG. 6 so that contact protrusions 54 of lower leaf spring 42 and upper leaf spring 44 were deflected toward one another by the stepped region of calibration fixture 70 that nominally provides a gap dimension of 0.125 inch. The instrumentation then was adjusted to zero the electrical output obtained from strain gauges 52. Next, sensor wand 26 was moved through passage 72 of calibration fixture 70 with electrical output readings being taken for each of the stepped calibration regions (indicated by calibration points 76 in FIG. 7).

In viewing FIG. 7, it can be noted that the invention provides an output signal that is substantially linear function of gap dimension. This linear relationship, which ensures highly accurate gap determination throughout the entire range of sensitivity, results from the previously described configuration of strain gauge sensor assembly 32 and the manner in which it is mounted and arranged in wand 28. Further, the linear characteristics are achieved in part by utilizing appropriate materials for the construction of lower leaf spring 42 and upper leaf spring 44. For example, in the currently preferred embodiments of the invention, both lower leaf spring 42 and upper leaf spring 44 are constructed of type 17-7 PH CRES steel that is 0.010 inch thick. The leaf springs are trimmed to the desired shape and dimensions and all openings (e.g. rectangular cutout 60) are formed by a laser beam cutter. After the leaf springs have been bent in an annealed state to the previously described configuration, the leaf springs are heat treated to condition CH900 by maintaining the leaf springs at a temperature of 900° for one hour and then allowing the leaf springs to cool at ambient air temperature.

It will be noted by those skilled in the art that the linear gap dimension-signal output relationship of FIG. 7 also permits the invention to be embodied so that gap dimension is directly indicated. Specifically, strain gauge instrumentation of the type discussed relative to FIg. 5 often includes range control that in effect multiplies the sensor output signal by a desired constant. By appropriate setting of such a range control the signal levels produced by the system can be established equal to panel warpage. For example, in the realization of the invention that provided the signal levels shown in FIG.

7 suitably setting such a range control would provide output readings ranging between 0 and 0.125, in accordance with panel warpage.

As was previously mentioned, certain dimensions of wand 28 and the dimensions of contact protrusions 54 of lower leaf spring 42 and upper leaf spring 44 are established to eliminate deflection of lower and upper leaf springs (42,44) that otherwise could be caused by twisting the tilting of wand 28 as it is passed through gap 22. This aspect of the invention can be understood with reference to FIGS. 8 and 9, which respectively illustrate twisting or rolling of sensor wand 26 in a gap 22 and tilting or pitching of sensor wand 26 in a gap 22.

Figure 8:
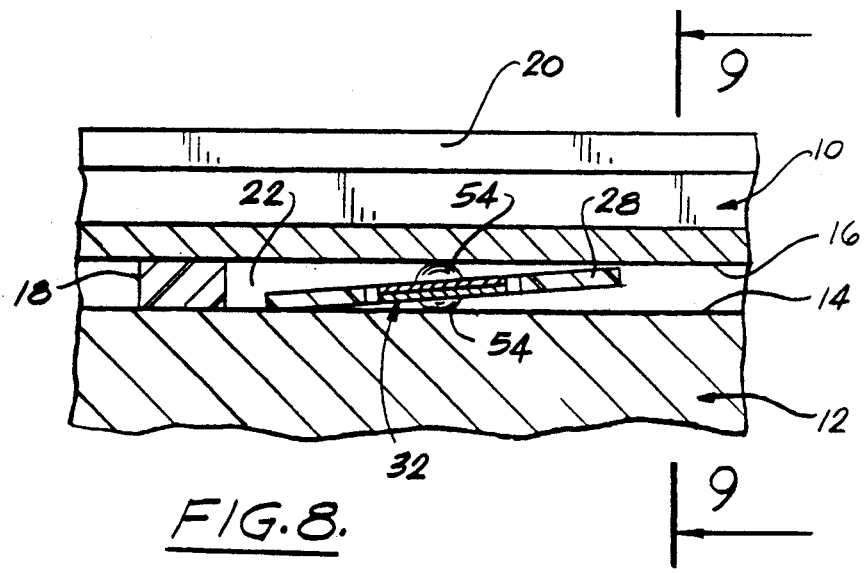
FIG. 8 is a partial cross-sectional view taken along arrows 8—8 of FIG. 4 to illustrate the manner in which the sensor and wand are configured to provide sensor insensitivity to twisting or rolling of the wand.

In viewing FIG. 8, it first can be noted that if contact protrusions 54 collectively defined a sphere of a diameter exactly equal to the dimension of gap 22, strain gauge sensor assembly 32 could be rolled or twisted through relatively large roll angles without further deflection of lower and upper leaf springs 42 and 44. That is, under such conditions, the geometry of contact protrusions 54 in effect would correspond to the geometry of a ball gauge. In view of this characteristic of contact protrusions 54, in the practice of the invention the radius of each contact protrusion 54 is dimensioned in accordance with the gap dimensions to be measured to substantially reduce undesired deflection of lower and upper leaf springs 42 and 44 is the strain gauge sensor assembly 32 is twisted or rolled when gap measurements are being taken. By way of example, in the previously mention realization of the invention that is configured for measurement of gaps in the range of 0.125 inch and 0.250 inch, substantial reduction in roll induced sensor deflection (and, hence, measurement error) can be obtained by utilizing contact protrusions 54 that are substantially hemispherical in geometry with each contact protrusion 54 having a radius that is greater than 0.0625 inch and less than 0.125 inch.

It also can be noted in FIG. 8 that the maximum angle through which wand 28 can be rolled or twisted is determined by the width of wand 28. Thus, by appropriately selecting the width of dimension of wand 28 in view of the sensor gap range and the radii of contact protrusions 54, roll induced measurement error can be further reduced. For example, the previously discussed embodiment of the invention that is configured for measurement of gaps 22 in the range of 0.125 inch to 0.250 inch utilizes a wand width of 1.5 inch with each contact protrusion having a radius of 0.087 inch. In that realization of the sensor wand 26, the maximum roll induced error was limited to 0.00025 inch, throughout the entire gap measurement range. Thus, that particular realization of the invention was fully suited for gauging the surface contour of composite panels 10 to a required contour tolerance of ±0.03 inch.

Dimensional considerations important to controlling pitch or tilt induced sensor measurement error can be understood with reference to FIG. 9, which illustrates sensor wand 26 positioned in a region of gap 22 that exhibits a radius of curvature. The type of gap measurement situation depicted in FIG. 9 commonly is encountered in gauging composite aircraft panels since such panels often exhibit contoured surface regions (the radius of which may be one the order of 30 inches). In viewing FIG. 9, it can be seen that the contact protrusion 54 dimensional considerations discussed relative to sensor wand roll (FIG. 8) also apply to reducing pitch induced measurement error. Further, it also can be seen that the maximum pitch angle that can be experienced by strain gauge sensor assembly 32 is determined by the distance between the end of wand 28 and the regions of contact protrusions 54 that contact layup surface 14 of mold 12 and surface 16 of composite panel 10. Thus, by suitably dimensioning and arranging the sensor region of wand 28, pitch induced measurement error can be minimized to an acceptable value. For example, in the previously discussed realization of sensor wand 26 in which the radius of each contact protrusion 54 is 0.087 inch, the distance between the end of sensor wand 26 and the center of each contact protrusion 54 is 3.22 inch. Dimensioned in this manner, pitch induced error was limited to no more than 0.00025 inch throughout the gap measurement range of 0.125 inch to 0.250 inch.

While the invention has been described in relation to a specific embodiment, it is to be understood that various changes, substitutions and alterations can be made without departing from the scope and spirit of the invention. For example, in some realizations of strain gauge sensor 32, rectangular cutout 60 may be of a different configuration. Similarly, it may be possible to utilize smoothly contoured contact protrusions other than the substantially hemispherical protrusions disclosed herein.

It also is contemplated that a gauging arrangement formed in accordance with this invention can be used where a mold is configured with at least a portion of the mold extending upwardly toward the vertical direction to, for example, define an upwardly projected curved portion of a panel that is employed in the leading or trailing edge of an aircraft wing. In such a situation, suitable spacer strips would be used to establish a gap of known dimension between all surfaces of the mold and the panel being inspected. Depending upon the angular orientation of the upwardly projecting mold and panel sections, it might be necessary to insert a sensor wand that is configured in accordance with the invention first from one edge of the mold and then insert the sensor wand from the oppositely disposed edge of the mold.

The embodiments of the invention in which an exclusive property or privilege is claimed are defined as follows:

1. A sensor wand for measuring dimensional variations in a gap of predetermined nominal gap dimension, said sensor wand comprising:

an elongate wand member having a first and second surface and a thickness that is less than said predetermined nominal gap dimension;

a strain gauge sensor assembly that is mounted near one end of said wand member, said strain gauge sensor assembly including first and second leaf spring members, the first end of said first and second leaf spring members being mounted to said wand member to maintain a fixed orientation relative to said first and second surfaces of said wand member, said first leaf spring member extending angularly away from one of said first surface of said wand member to position the second end of said first leaf spring member away from said first surface of said wand member, said second leaf spring member extending angularly away from said second surface of said wand member to position the second end of said second spring member away from said second surface of said wand member, each said first and second leaf spring member including an outwardly extending contact protrusion for bearing against one of the surfaces that define said gap to be measured, the region of each said contact protrusion that bears against said surface being contoured to control deflection of said first and second leaf spring members as a result of said wand member being rotated about its longitudinal centerline, said first leaf spring member further including a first strain gauge mounted thereon to sense deflection of said second end of said first leaf spring member toward and away from said first surface of said wand member, said second leaf spring member further including a second strain gauge mounted thereon for sensing deflection of said second end of said second leaf spring member toward and away from said second surface of said sensor wand; and electrical connections for electrically connecting said first and second strain gauges to instrumentation for supplying an electrical signal to said first and second strain gauges and for receiving an electrical signal supplied by said first and second strain gauges.

2. The sensor wand of claim 1 wherein said contoured regions of both said first and second contact protrusions are of substantially hemispherical geometry.

3. The sensor wand of claim 1 wherein the region adjacent said first end of said first leaf spring member is relatively flat and said first leaf spring member is mounted to said wand member to maintain said relatively flat region substantially parallel with said longitudinal centerline of said elongate wand; and wherein the region adjacent said first end of said second leaf spring member is relatively flat and is joined to said relatively flat region of said first leaf spring member to symmetrically position said first and second leaf spring members relative to one another.

4. The sensor wand of claim 3 wherein said relatively flat region of said first leaf spring member includes a centrally located cutout region that is positioned below said first end of said second leaf spring member to equalize the deflection characteristics of said first and second leaf spring members.

5. The sensor wand of claim 4 wherein said contoured regions of both said first and second contact protrusions are of substantially hemispherical geometry.

6. The sensor wand of claim 5 wherein said wand member includes a cutout region extending between said first and second surfaces of said wand member with said strain gauge sensor assembly being mounted in said cutout region; and, wherein the distance between the end of said wand member nearest said strain gauge sensor assembly and said region of said contact protrusions that bears against said surfaces is established to further control deflection of said first and second leaf spring members as a result of said wand member being rotated about its longitudinal centerline.

7. The sensor wand of claim 6 wherein the width of said wand member is established to further control deflection of said first and second leaf spring members as a result of said wand member being rotated about its longitudinal centerline.

8. Apparatus for gauging differences between the shape of a part and the shape of a mold upon which the part was formed, said apparatus comprising:

a plurality of elongate relatively flexible spacer strips, each having a predetermined thickness, said elongate relatively flexible strips being placeable on the molding surface of said mold in spaced-apart relationship with one another to support said part in spaced-apart juxtaposition with regions of said mold that formed said part and form a gap between said part and said mold that has a dimension substantially equal to said predetermined thickness of said spacer strips; and an elongate relatively flexible sensor wand dimensioned for insertion in said gap formed between said part and said molding surface, said sensor wand including a pair of leaf springs with each leaf spring being mounted near one end of said wand and extending angularly away from one another and outwardly from said sensor wand, each said leaf spring including a contact protrusion with one of said contact protrusions bearing against said part and the other of said contact protrusions bearing against said molding surface when said sensor wand is inserted in said gap between said part and said molding surface, said pair of leaf springs and said contact protrusions being dimensioned to deflect said leaf springs toward one another when said sensor wand is inserted in said gap, said sensor wand further including first and second pairs of strain gauges with one of said pairs of strain gauges being mounted to a first one of said leaf springs to sense deflection of said first leaf spring as said sensor wand is moved to various locations within said gap, the second one of said pairs of strain gauges being mounted to the second leaf spring of said pair of leaf springs to sense deflection of said second leaf spring as said sensor wand is moved to various locations within said gap, said sensor wand further including electrical conductors for interconnecting said first and second strain gauge pairs with instrumentation for supplying electrical signals to said strain gauges and receiving electrical signals from said strain gauges.

9. The apparatus of claim 8, further comprising a calibration fixture having a passageway dimensioned for insertion of said sensor wand, said passageway including a series of stepped regions with each said stepped region exhibiting a gap dimension that is within the gauging range of said sensor wand.

10. The apparatus of claim 8 wherein the width of said sensor wand substantially exceeds said predetermined thickness of said spacer strips to limit rotation of said sensor wand within said gap formed between said part and said mold.

11. The apparatus of claim 10 wherein each said contact protrusion is smoothly contoured to substantially eliminate deflection of said leaf springs toward one another when said sensor wand is rotated with said gap formed between said part and said mold.

12. The apparatus of claim 11 wherein each said contact protrusion is substantially hemispherical and exhibits a radius that is not less than one-half predetermined thickness of said spacer strips.

13. A method for gauging differences between the surface contour of a part and the surface of a mold upon which the part was formed to establish said surface contour, said method comprising the steps of:

supporting said part in spaced apart juxtaposition with said mold to form a gap of predetermined nominal dimension between said contoured surface of said part and said surface of said mold that established said contoured surface;

inserting into said gap a flexible sensor wand having outwardly extending first and second strain gauge equipped leaf springs that respectively contact said contoured surface of said part and said surface of said mold that established said contoured surface, said leaf springs being deflected inwardly to vary the resistive value of said strain gauges in accordance with the exact dimension of said gap;

energizing said strain gauges with an electrical signal to facilitate production of an electrical signal that is representative of said exact dimension of said gap;

urging said sensor wand through said gap; and monitoring said electrical signal representative of said exact dimension of said gap as said sensor wand is urged through said gap to detect differences between said predetermined nominal dimension of said gap and said exact dimension of said gap.

14. The method of claim 13 further comprising the step of calibrating said sensor wand prior to said step of inserting said sensor wand in said gap, said step of calibrating including the steps of sequentially deflecting said first and second leaf springs to a plurality of positions that correspond to gap dimensions that are within a predetermined range of gap dimensions, and for each said position of said leaf springs determining the value of said signal representative of said exact gap dimension.

* * * * *

UNITED STATES PATENT AND TRADEMARK OFFICE
CERTIFICATE OF CORRECTION

PATENT NO. : 5,000,037

DATED : March 19, 1991

INVENTOR(S) : Joseph M. Baresh

It is certified that error appears in the above-identified patent and that said Letters Patent is hereby corrected as shown below:

| COLUMN | LINE | |
|---|---|---|
| 4 | 53 | after "accessory" insert --to-- |
| 5 | 53 | "layer" should be --layup-- |
| 8 | 17 | after "wand" insert --28 and includes a central notch 58 that is rectangular in shape. When sensor wand-- |
| 9 | 31 | "mode" should be --model-- |
| 10 | 36 | after "is" insert --a-- |
| 10 | 63 | "FIg. 5" should be --FIG. 5-- |
| 11 | 27 | "is" should be --if-- |
| 11 | 30 | "mention" should be --mentioned-- |
| 11 | 63 | "one" should be --on-- |
| 14 | 65 | "into" should be --in-- |
| [57] Abstract | 6 | after "support a" insert --composite panel (10) that was formed on the mold (10) with the surface (16) of the-- |
| [57] Abstract | 22 | "singnals" should be --signals-- |

UNITED STATES PATENT AND TRADEMARK OFFICE
CERTIFICATE OF CORRECTION

PATENT NO. : 5,000,037

DATED : March 19, 1991

INVENTOR(S) : Joseph M. Baresh

It is certified that error appears in the above-identified patent and that said Letters Patent is hereby corrected as shown below:

Title Page:
[56] Refs. Cited   6th listed reference   "3,821,856 7/1974 Rap" should be --3,821,856 7/194 Rapp--.

Signed and Sealed this

Twenty-seventh Day of October, 1992

Attest:

DOUGLAS B. COMER

Attesting Officer

Acting Commissioner of Patents and Trademarks